United States Patent [19]

Bolger

[11] Patent Number: 4,907,474
[45] Date of Patent: Mar. 13, 1990

[54] MECHANICAL TORQUE CONVERTER

[75] Inventor: John G. Bolger, Orinda, Calif.

[73] Assignee: Inductran Corporation, Berkeley, Calif.

[21] Appl. No.: 255,011

[22] Filed: Oct. 7, 1988

[51] Int. Cl.⁴ .............................................. F16H 3/74
[52] U.S. Cl. ........................................ 475/14; 74/112; 74/125.5; 475/149; 475/255
[58] Field of Search ...................... 74/752 F, 793, 112, 74/125.5

[56] References Cited

U.S. PATENT DOCUMENTS

| | | | |
|---|---|---|---|
| 2,033,343 | 3/1936 | Larkin, Jr. | 74/752 F |
| 3,540,310 | 11/1970 | Preston | 74/752 F |
| 3,960,036 | 6/1976 | Moller | 74/752 F X |
| 4,282,772 | 8/1981 | Franch | 74/125.5 X |

FOREIGN PATENT DOCUMENTS

| | | | |
|---|---|---|---|
| 1233691 | 10/1960 | France | 74/752 F |
| 133286 | 1/1920 | United Kingdom | 74/752 F |
| 190012 | 12/1922 | United Kingdom | 74/752 F |
| 427235 | 4/1935 | United Kingdom | 74/752 F |
| 472895 | 9/1937 | United Kingdom | 74/752 F |

Primary Examiner—Dwight G. Diehl
Attorney, Agent, or Firm—Owen, Wickersham & Erickson

[57] ABSTRACT

A mechanical torque converting transmission for producing an output with variable, controllable speed and torque characteristics comprises a rotary input shaft adapted for attachment to a rotary power source and connected to a main drive gear. The drive gear is meshed with a plurality of pinion gears which are journaled for rotation on an arm assembly. An eccentric device is driven by each pinion gear for creating a centrifugal force that cyclically urges the arm assembly in alternating forward and backward directions with a pulsating motion during each rotation of each eccentric device. A clutch is provided for allowing forward movement of the arm assembly while preventing movement in the backward direction during each eccentric revolution. A resiliently displaceable device interconnecting the arm assembly and an output shaft transforms the pulsating motion of the arm assembly to a smooth rotational motion of the output shaft, thereby causing the output shaft to rotate at a different speed and torque from that of the input shaft. Controls can be utilized to activate or deactivate the clutch and also change the phase relationship of the driven eccentric devices in order to vary the transmission output under varying load conditions.

24 Claims, 12 Drawing Sheets

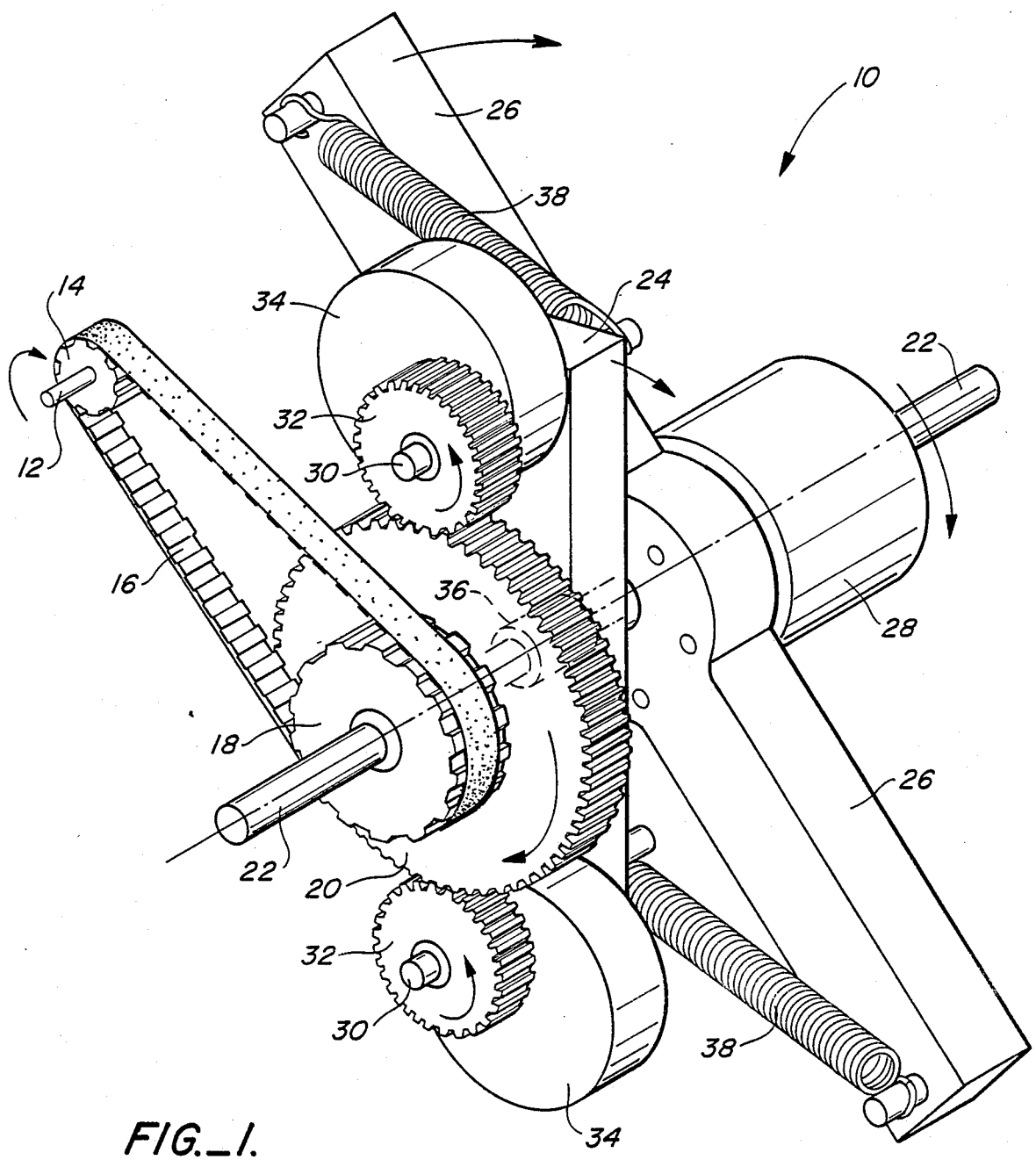
FIG._1.

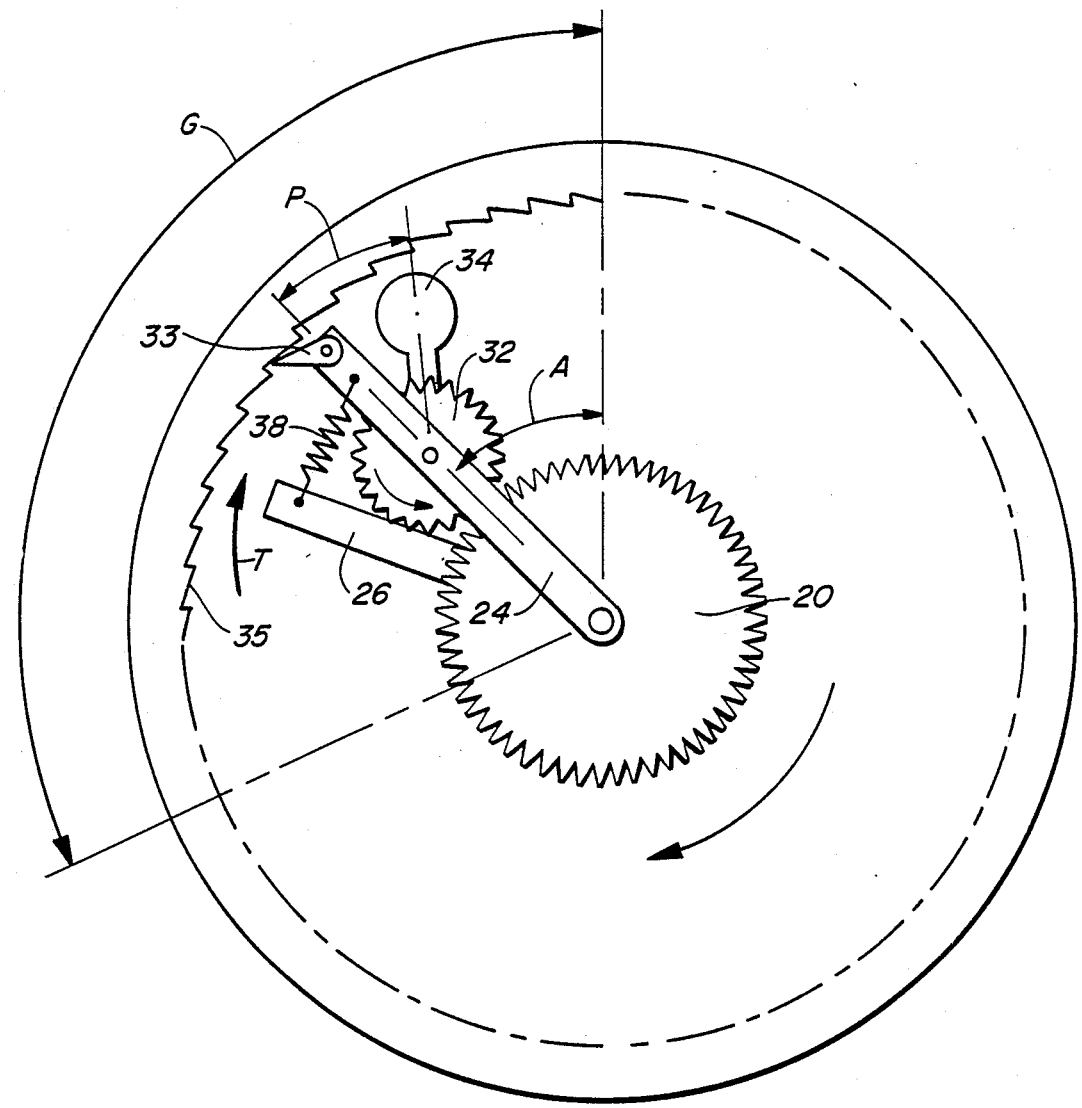
FIG._2.

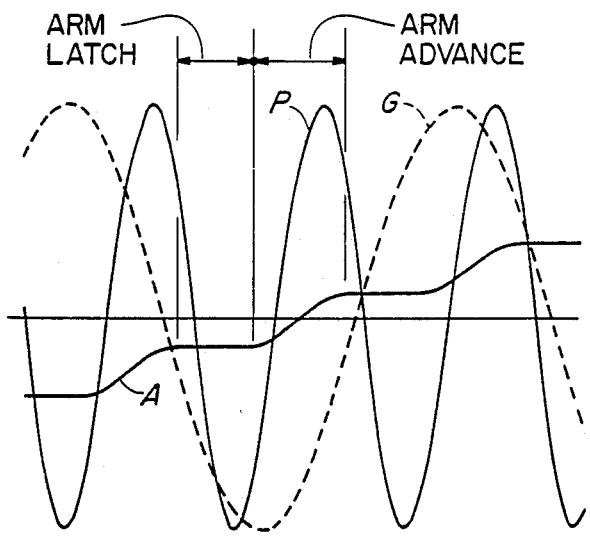
FIG._3A.
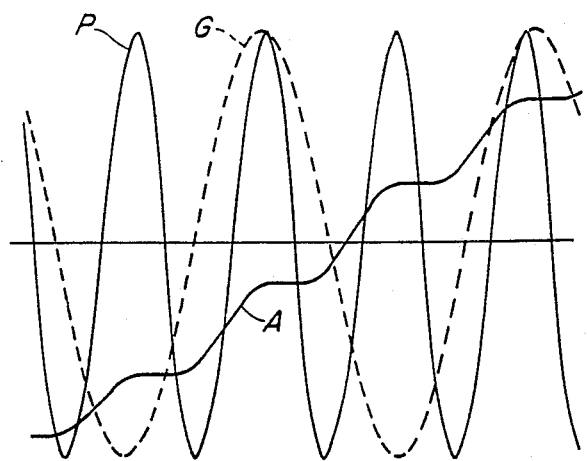
FIG._3B.
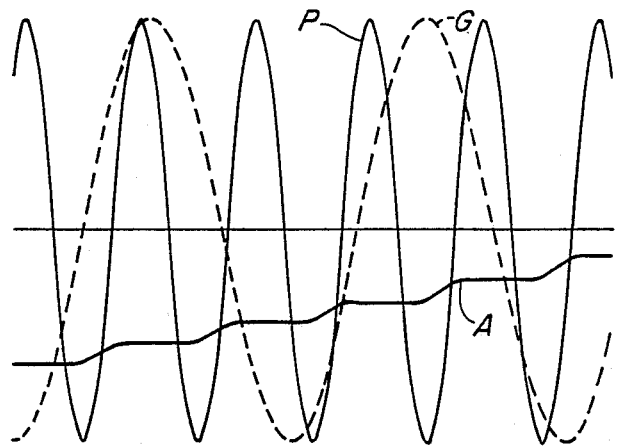
FIG._3C.
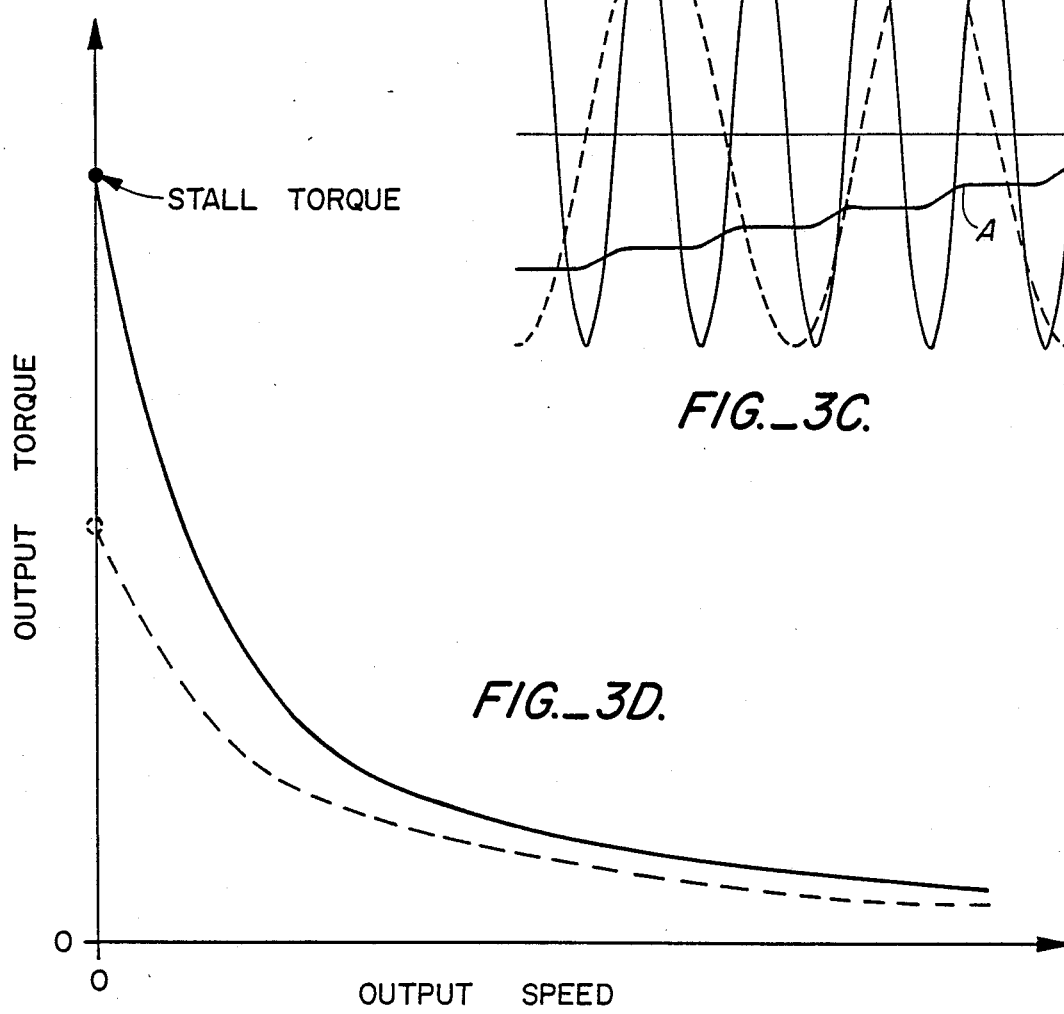
FIG._3D.

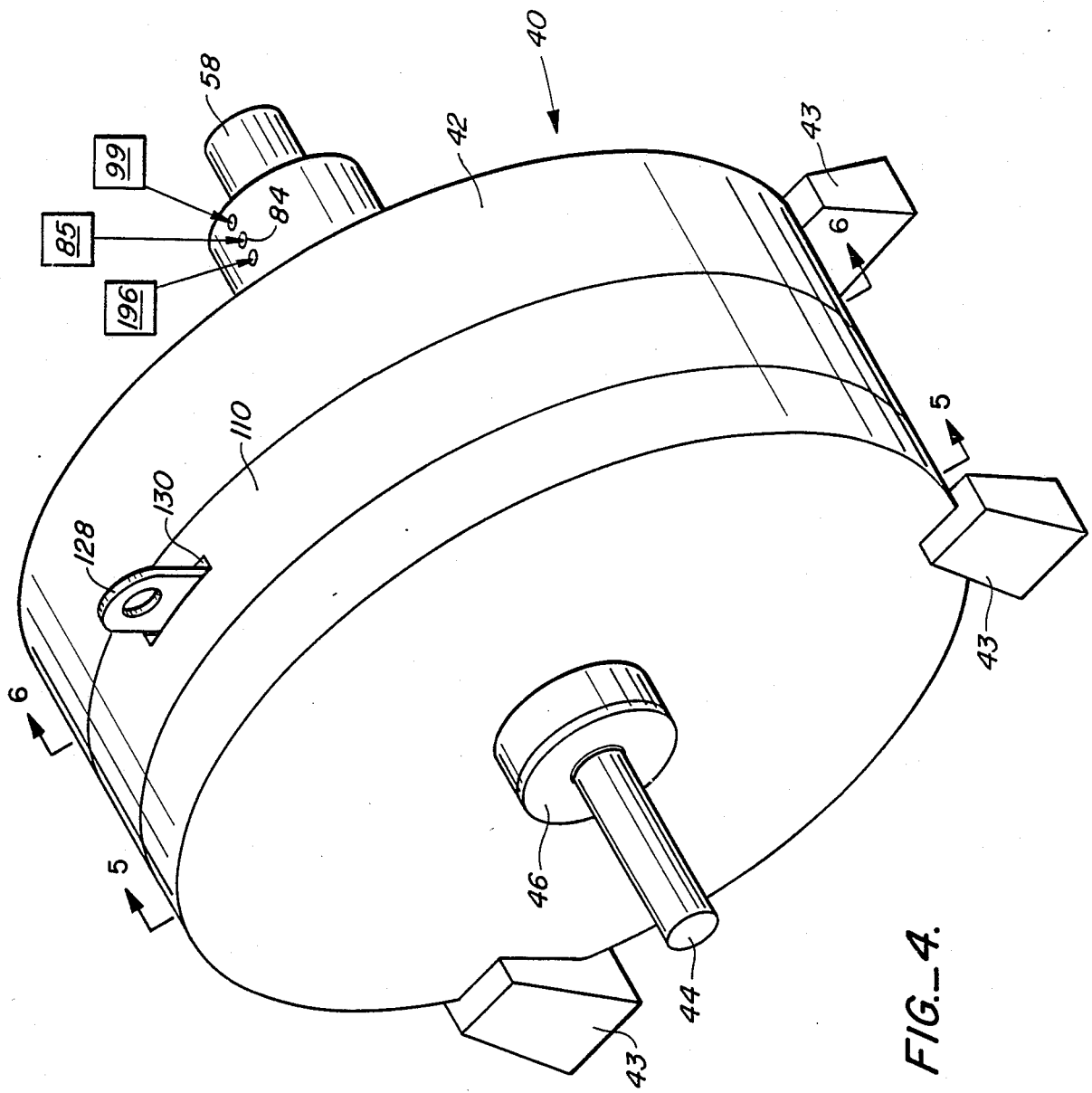
FIG._4.

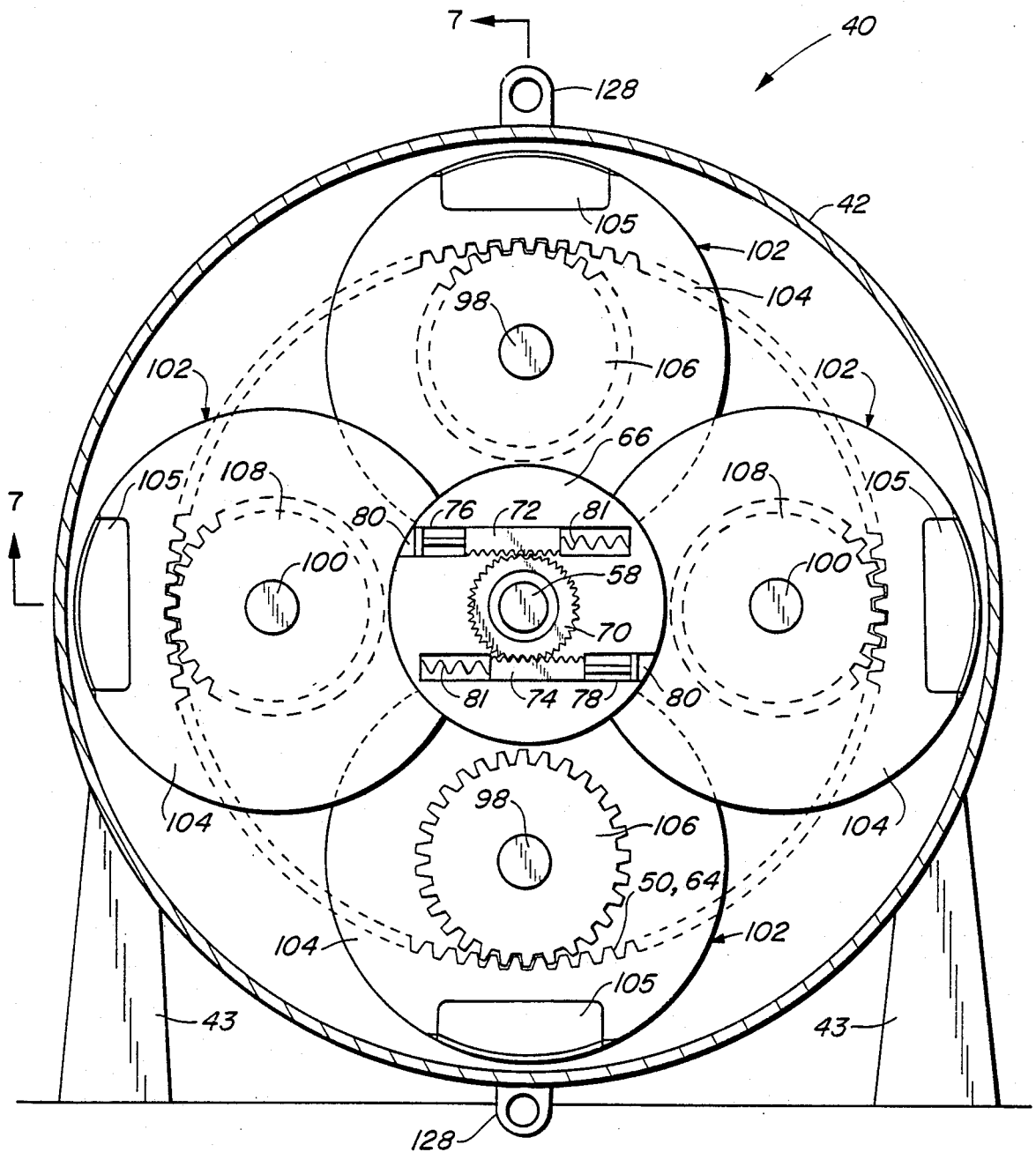
FIG._5A.

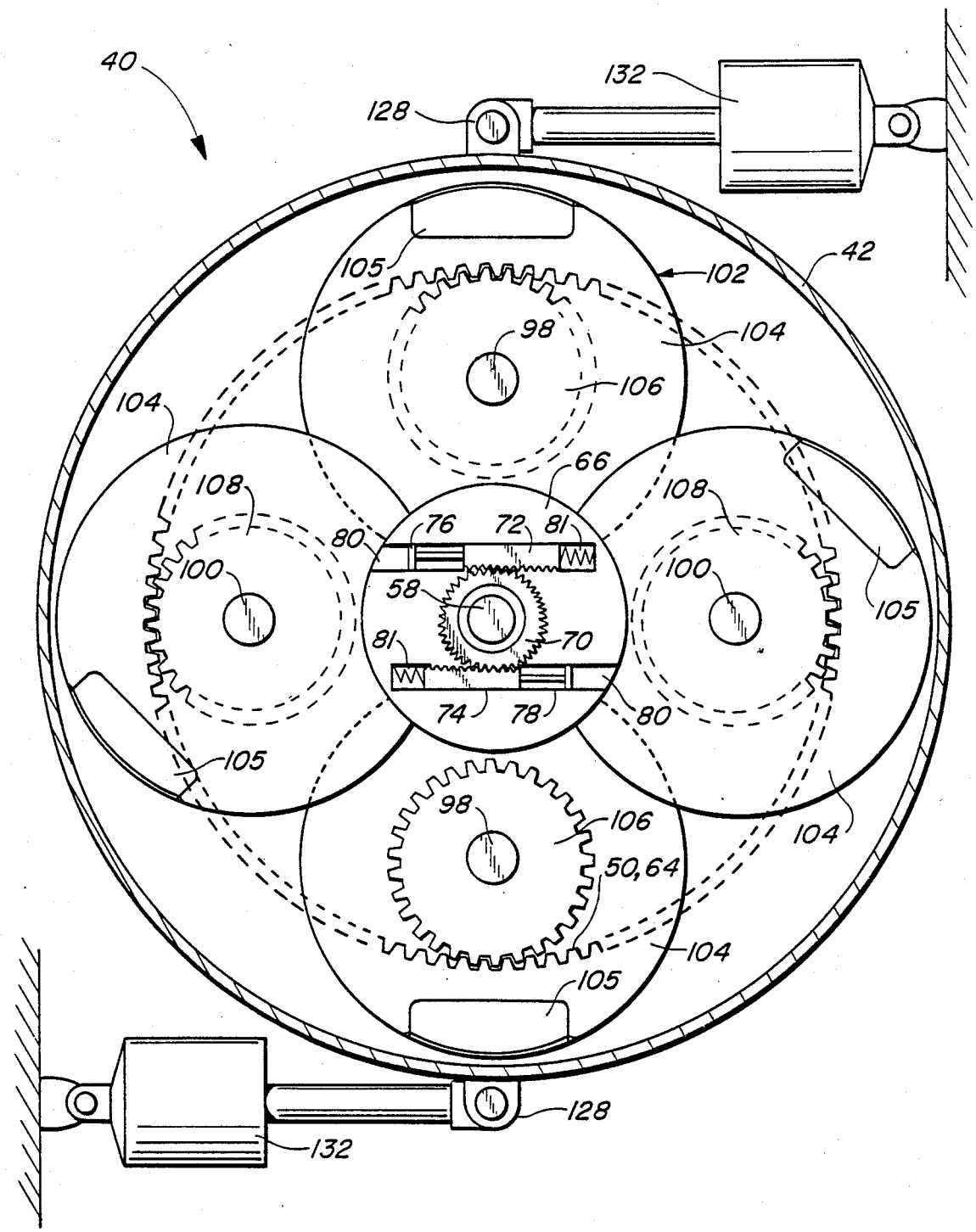
FIG._5B.

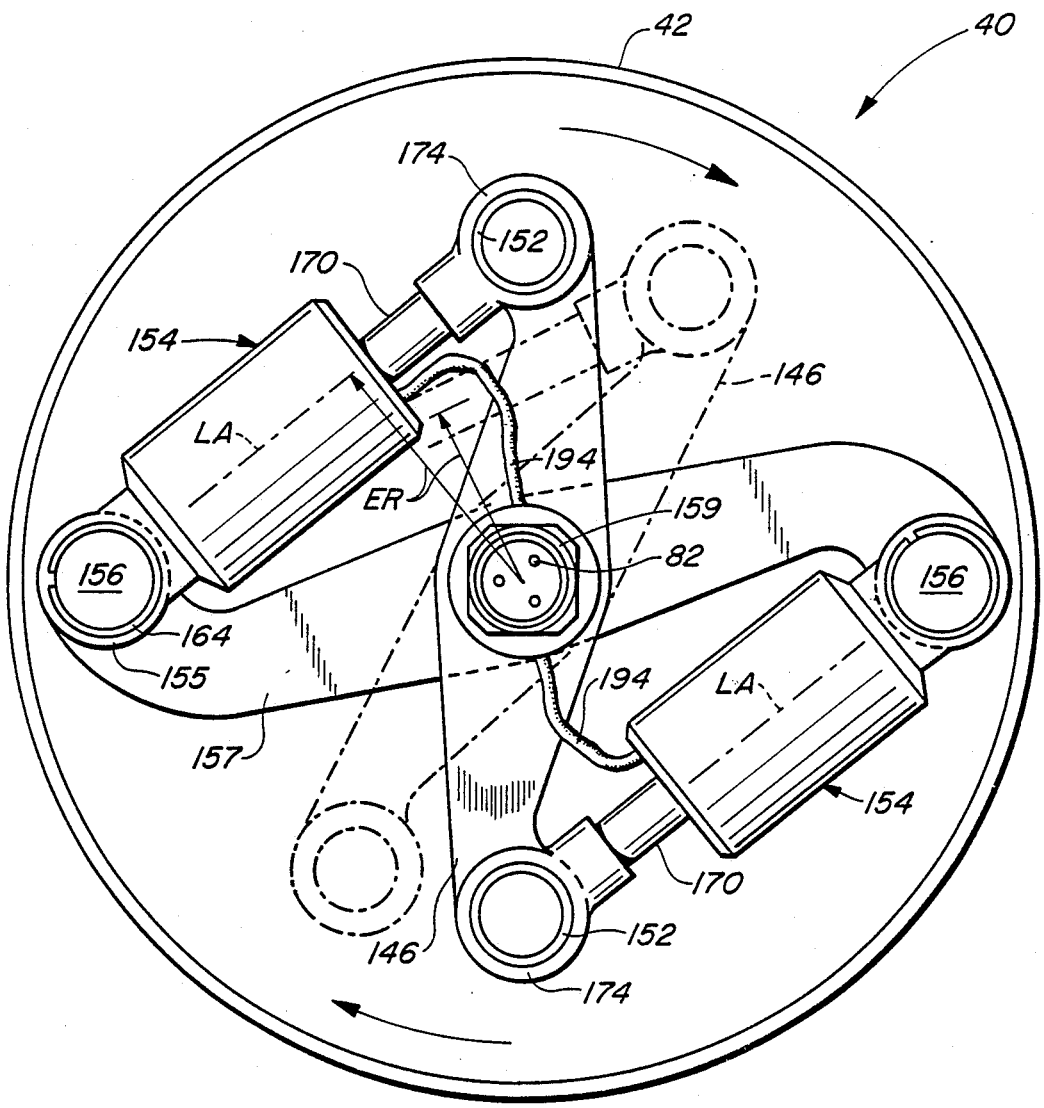
FIG._6.

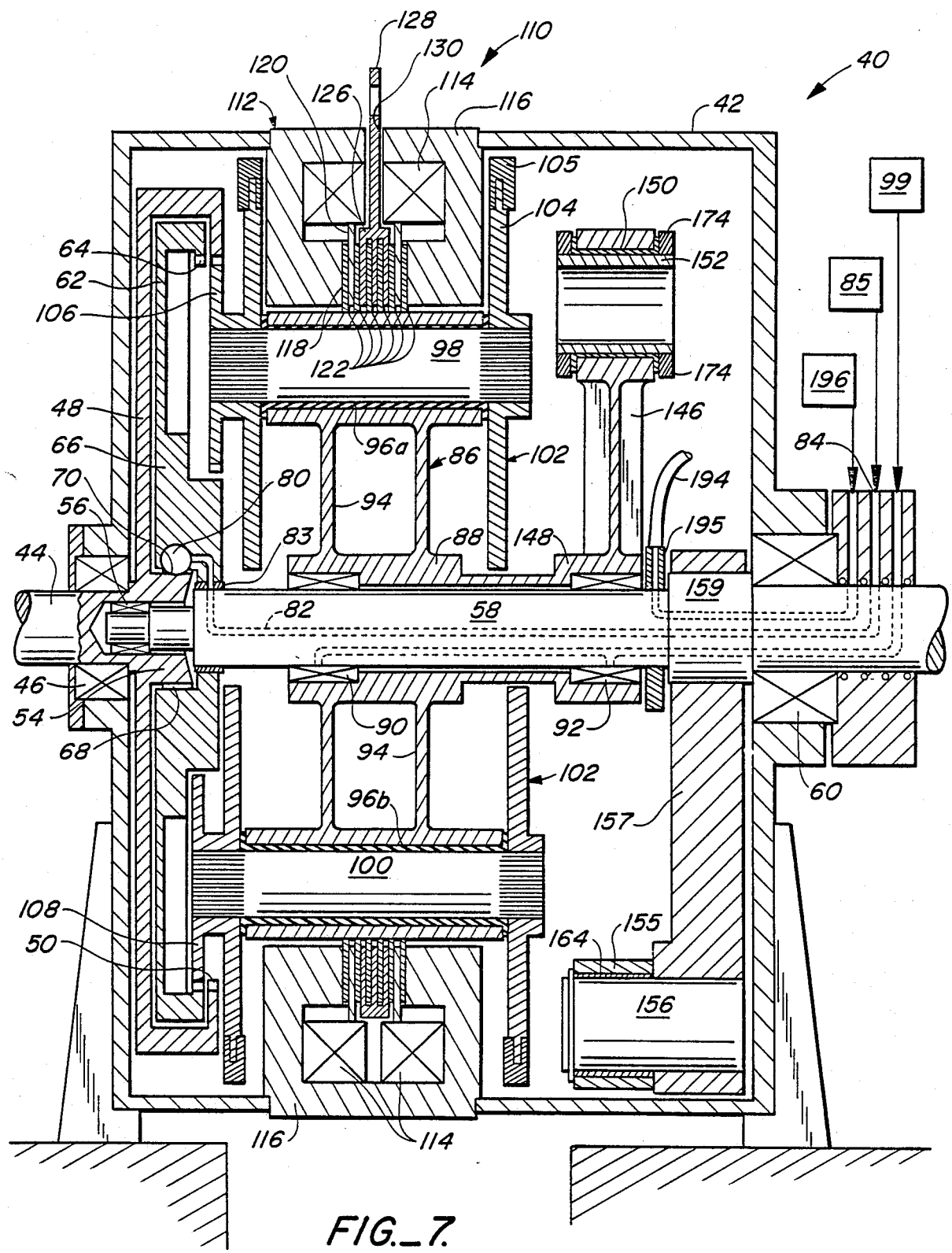
FIG._7.

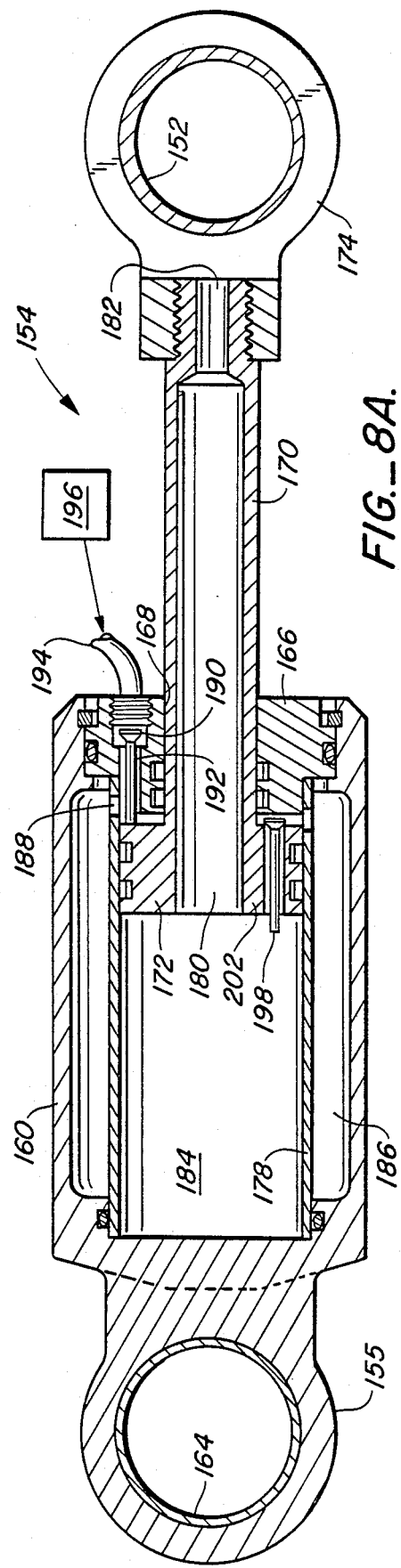
FIG._8A.
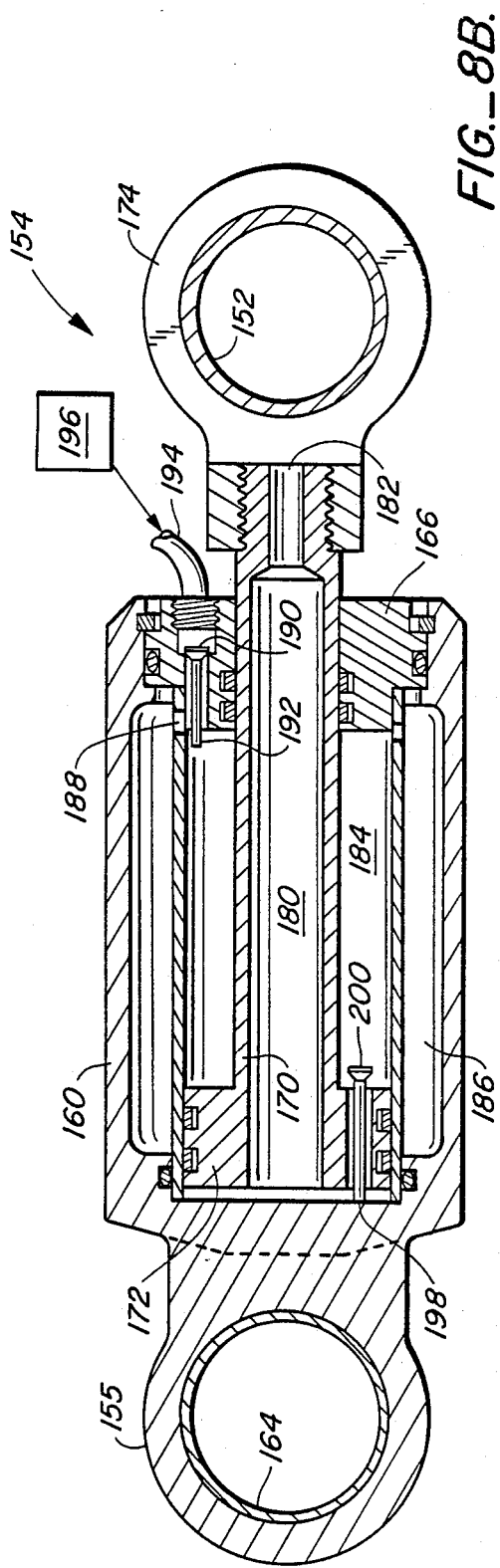
FIG._8B.

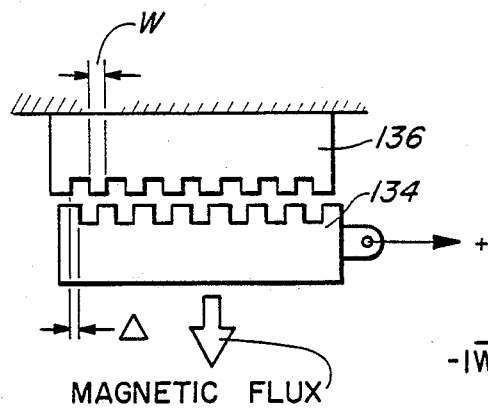
FIG._9A.
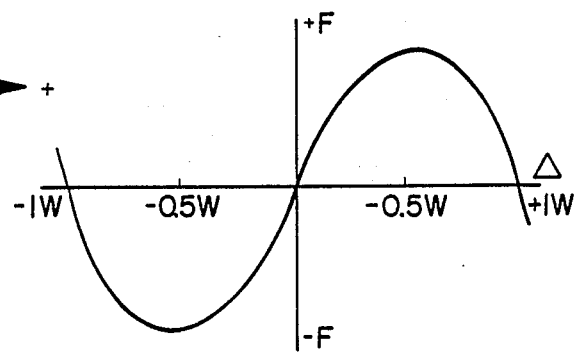
FIG._9B.
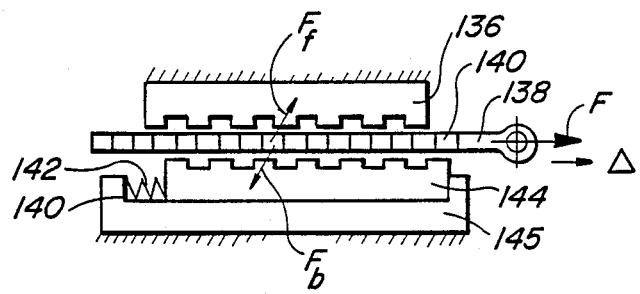
FIG._9C.
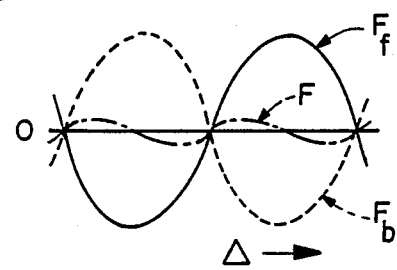
FIG._9D.
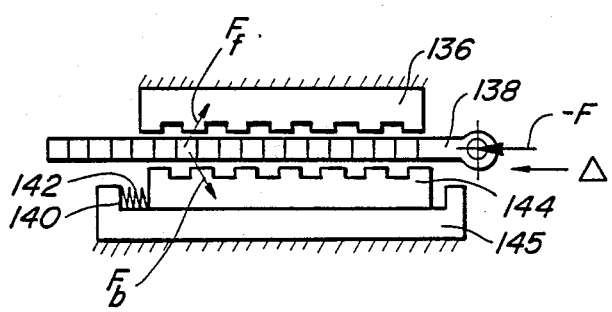
FIG._9E.
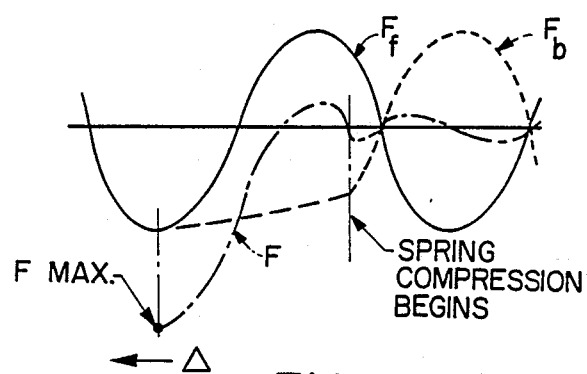
FIG._9F.

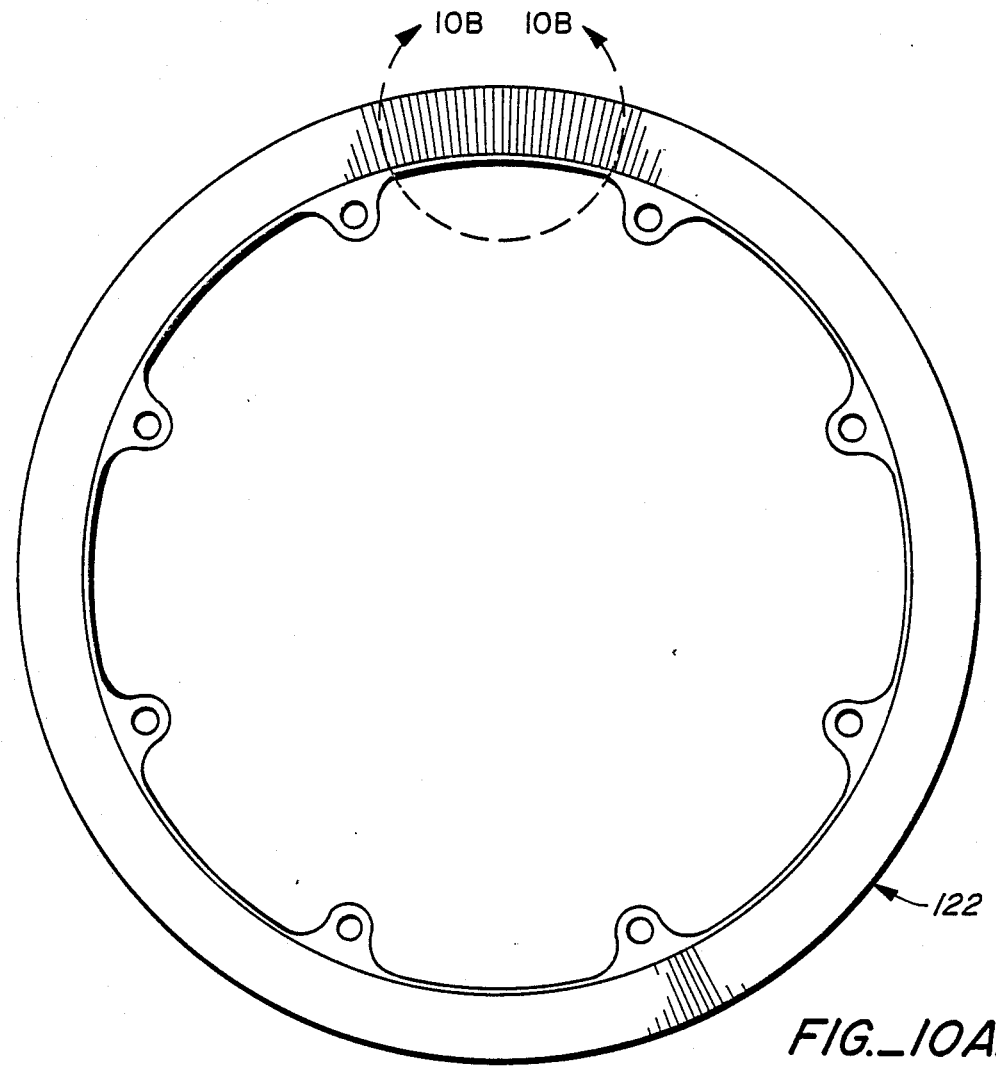
FIG._10A.
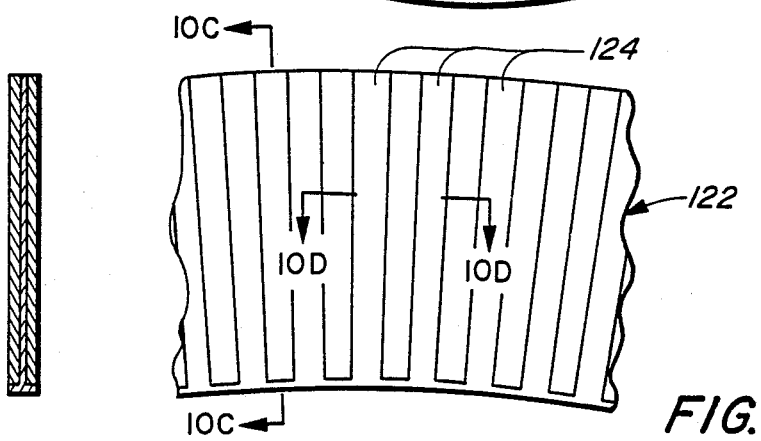
FIG._10C.  FIG._10B.
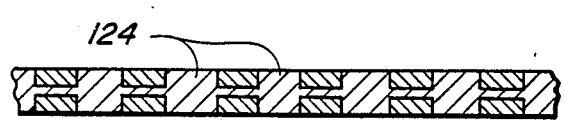
FIG._10D.

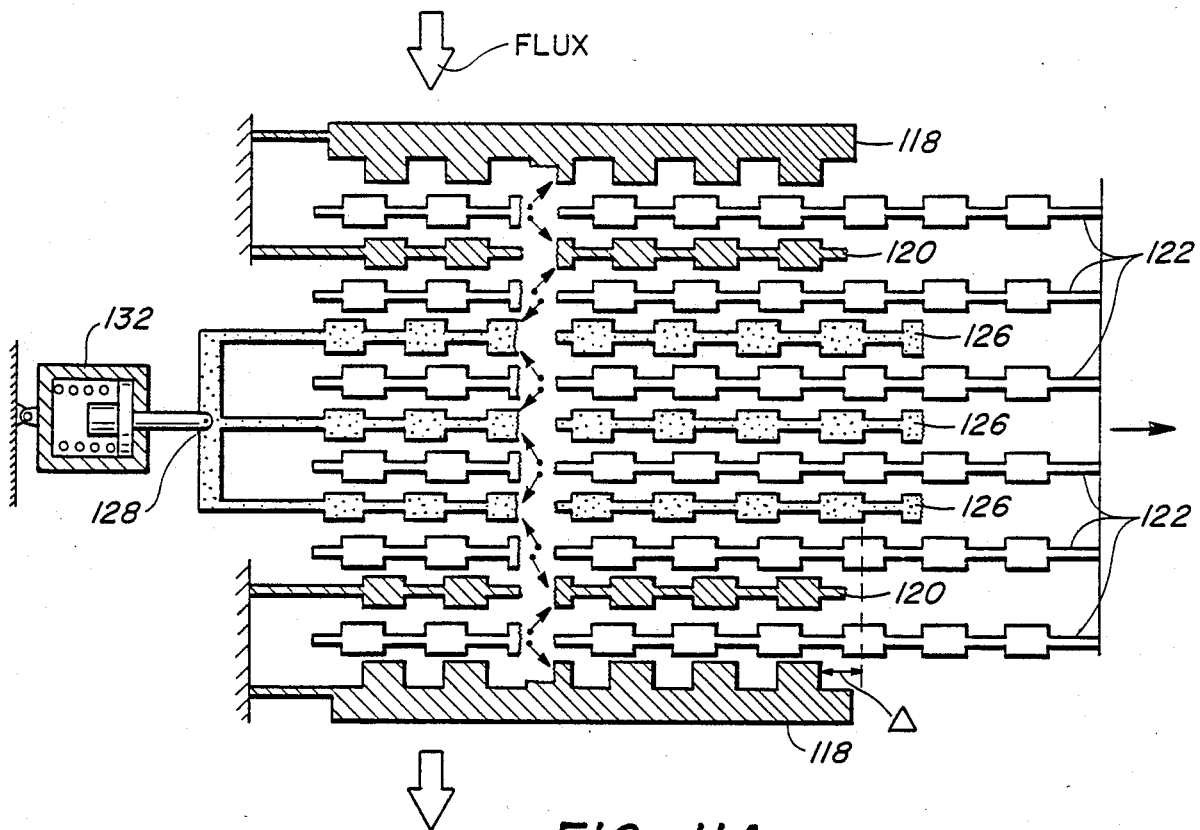
FIG._11A.
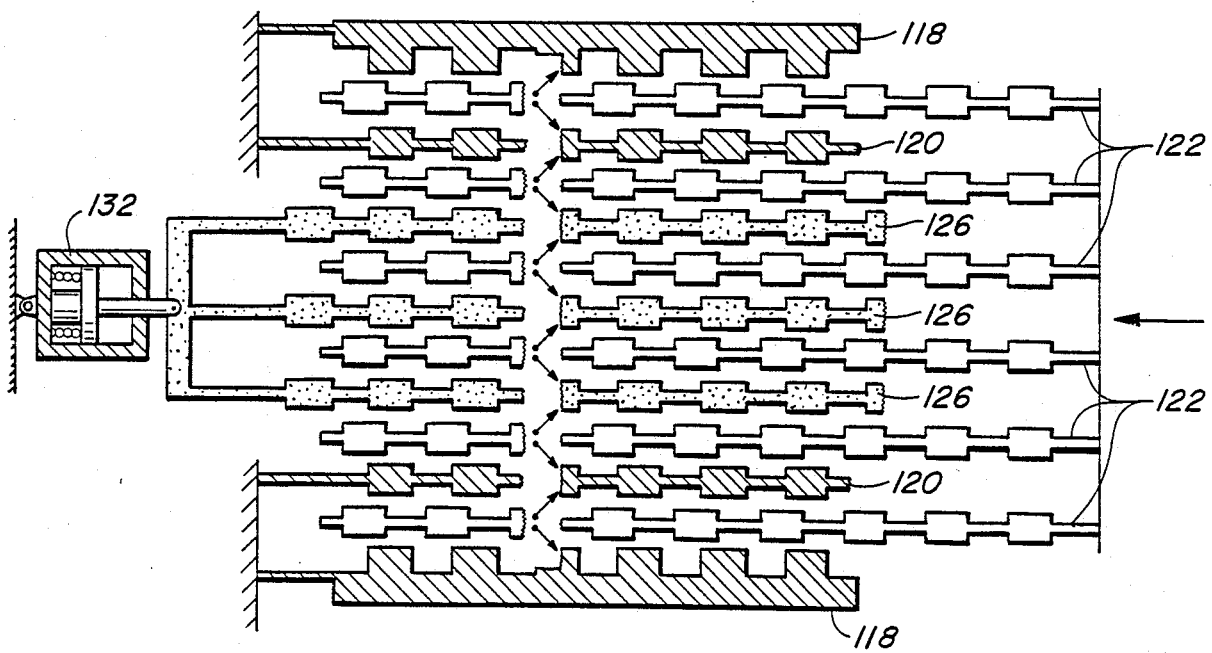
FIG._11B.

MECHANICAL TORQUE CONVERTER

This invention relates to a mechanism for mechanically transferring torque from one rotating shaft to another and in particular to a transmission mechanism that will enable an engine or motor to deliver power to a load at optimum torque and speed levels.

BACKGROUND OF THE INVENTION

For relatively heavy vehicles such as locomotives, tractors, or automobiles a continuously variable transmission ratio is required because of the wide range of operating conditions. For example, in accelerating a locomotive from a standstill, a very high output torque is required even though the horsepower is low. As the locomotive gains speed, it is desirable to deliver maximum horsepower from the engine from its low to a maximum speed in order to achieve the shortest possible acceleration cycle. Once the locomotive is at cruising speed, it becomes desirable to operate the engine at a rotative speed that will result in the minimum specific fuel consumption for the needed power output. Thus, heretofore the objective of mechanical torque converter development has been to provide a transmission that will transfer power from a prime mover to a load with a controllable speed ratio.

Torque converters cause a working mass to undergo an acceleration/deceleration cycle wherein the accelerative forces are provided by the prime mover and a reaction member(s), and the deceleration forces are provided by the output member. The impulses caused by these accelerations/decelerations cause the prime mover to do work on the output member. A stationary reaction member is required to exert forces on the mass without contributing work if a torque multiplication is to occur. The most common type of torque converter is the hydrodynamic type, wherein the working mass is a fluid, the accelerating means is a turbine/pump, the output means is a turbine, and the reaction member is a set of fixed vanes. The losses in a hydrodynamic converter are substantial because of turbulence and viscous friction, and the torque conversion (increase) is typically less than 3.

The prior art utilized either selectable sets of gears with particular ratios, sometimes supplemented with hydrodynamic torque converters that extended the ratio range and allowed shifting of gear sets without shock. Other systems included motor/generator sets driven by the prime mover, or variable displacement hydraulic pump/motor sets driven by the prime mover. All of these devices involved either functional compromises, noise or durability problems, and all operated with significant losses. Smaller transmissions sometimes used variable pitch Vee belt drives, variable pitch diameter traction (friction) drives, or incrementing drives with variable stroke such as using over-running mechanical clutches. These transmissions typically exhibited poor durability. A general object of the present invention is to overcome these problems with a mechanical torque converter wherein all moving masses and members are supported by antifriction bearings, with only relatively insignificant electromagnetic, electrical, and windage losses so that high torque conversion ratios with high efficiency are provided within a wide speed range.

Another object of the invention is to provide a mechanical torque converter with controllability features that include: inherent output torque control by controlling the relative speed of the input with respect to the output speed; and control of the rate of torque increase with increase of differential speed.

Another object of the invention is to provide a mechanical torque converter with a wide operating range which is applicable to various power transmission systems.

Still other objects of the invention are to provide a mechanical torque converter: that has high input to output efficiency throughout its operating range; that is highly controllable with respect to input and output speed and torque; and is highly durable since it has a minimum of wearing or sliding parts and has a high degree of immunity from any shock due to abrupt changes in output load.

SUMMARY OF THE INVENTION

In accordance with the principles of the invention, a mechanical torque converter is provided which uses solid masses in its momentum cycle. The masses are caused to undergo acceleration and deceleration by their attachment to eccentrics that are driven by gears or sprockets. The gears or sprockets, in turn are rotated at the differential speed between the input and the output members. In a basic arrangement according to the invention, an input gear causes a pinion and an attached mass to rotate. The pinion is mounted on a shaft that is part of an arm which includes a sprag or some other type of one-way clutch that allows the arm to move only in one rotative direction. A second radial member serves as the output member; and a spring is provided between the pinion arm and the output member. As the pinion and mass rotate, a centrifugal force is developed that alternatively urges the arm clockwise and counterclockwise. This force extends the arm spring during approximately half of the pinion rotation during which the centrifugal force is in the forward direction. This causes an output torque to be developed. During the remainder of the pinion's rotation, the centrifugal force exerts a reverse force on the arm which is resisted by the one-way clutch, which transfers a force in the forward direction from the fixed member, i.e. a reaction force.

If the output member is stalled, e.g. the driven vehicle is at standstill, a very high starting torque can be developed by rotating the input at a high speed, even though the input does essentially no work other than to extend the spring. As the output member begins to move, the input must supply the work being done, but it can do this at high speed/low torque conditions. This allows a small motor or engine to develop high torques up to the point that the motor reaches its horsepower limit.

In a more versatile embodiment of the invention the input shaft (attached to an engine output) is connected to a pair of gear wheels each of which drives a pair of pinions that are spaced 180° apart. Each pinion drives a disc with an attached eccentric mass. A control means is provided which varies the relative rotative positions of the two gears and thus the phase relationship of the mass discs. All four of the mass-discs are mounted on an arm assembly which is rotatable on an output shaft. A clutch mechanism for neutralizing the reverse torque forces, i.e. the reaction forces, is also fixed to the arm assembly. An output arm is fixed to the hub of the arm assembly and is connected by a pair of load cylinders to an output arm that is fixed to the output shaft. Thus, as the input shaft rotates, causing the pinion and their attached mass-discs to spin, forward force on the output shaft is developed through the load cylinders, while the clutch mechanism opposes the rearward torque forces caused by the eccentric masses on the discs. The control on the two gear wheels can be adjusted so that when the eccentric masses on all four discs are "in-phase", maximum forward torque is developed on the output shaft. Conversely, when the masses for one pair of discs is "out-of phase" with those of the other pinion pair, the reverse torque forces cancel out the forward forces and the output shaft has zero torque.

The clutch mechanism in the latter embodiment is preferably magnetically controlled so that it can be turned on or off by electrical signals and operates without mechanical friction.

Other objects, advantages and features of the invention will become apparent from the following detailed description of embodiments presented in conjunction with the accompanying drawing.

BRIEF DESCRIPTION OF THE DRAWING

FIG. 1 is a pictorial diagrammatic view of a transmission embodying principles of the present invention.

FIG. 2 is a functional diagrammatic view of the transmission of FIG. 1.

FIG. 3A, 3B and 3C are diagrams showing relative movements of various components of the transmission of FIG. 1 under different operational conditions.

FIG. 3D is a typical curve showing output torque versus speed for an apparatus according to the present invention.

FIG. 4 is a view in perspective of a modified form of transmission embodying the present invention.

FIG. 5 is a view in section taken generally along line 5—5 of FIG. 4 showing internal mass discs for the transmission in one orientation.

FIG. 5B is a view in section similar to FIG. 5A showing the internal mass discs in a different orientation which produces a reduced output torque for the transmissions.

FIG. 6 is a view in section taken along line 6—6 of FIG. 4 showing load cylinders for the transmission according to the invention.

FIG. 7 is a view in elevation and in section of the transmission shown in FIG. 5A.

FIG. 8A is a view in section of the load compensating device shown in FIG. 6.

FIG. 8B is a view in section showing the load device of FIG. 8A in its compressed position.

FIG. 9A is a diagrammatic view of a two element magnetic clutch device.

FIG. 9B is a diagram illustrating the force/displacement relationship for the clutch device of FIG. 9A.

FIG. 9C is a diagrammatic view of a three element magnetic clutch device.

FIG. 9D is a typical force/displacement diagram for the clutch device of FIG. 9C.

FIG. 9E is a diagrammatic view of the device of FIG. 9C showing the intermediate element with a negative force.

FIG. 9F is a diagram showing the force/displacement relationship for the device of FIG. 9E.

FIG. 10A is an end view in elevation of a ring member forming part of th clutch used on the transmission of FIG. 7.

FIG. 10B is an enlarged fragmentary view of the ring member of FIG. 10A taken along line 10B—10B thereof.

FIG. 10C is a view in section taken along line 10C—10C of FIG. 10B.

FIG. 10D is a view in section taken along line 10D—10D of FIG. 10B.

FIG. 11A is a diagrammatic view of the magnetic clutch showing its elements in free running position in the forward direction.

FIG. 11B is a diagrammatic view of the magnetic clutch showing its elements in position for preventing the rearward motion of the rotating elements.

DETAILED DESCRIPTION OF EMBODIMENT

With reference to the drawing, FIG. 1 illustrates one configuration of a transmission 10 embodying principles of the present invention. In broad terms, this transmission comprises an input shaft 12 adapted for connection with a power source such as an engine (not shown) that provides a shaft output having variable speed and torque ranges. The input shaft in this embodiment is fixed to a small pulley wheel 14 which is connected via a pulley belt 16 to a larger pulley wheel 18 fixed to an input gear 20. This gear is rotatable on a fixed non-rotatable shaft 22 which also supports a rotatable pinion arm 24 and an output arm 26 to which is attached a drum 28 that produces output torque from the transmission 10. An output shaft (not shown) may be connected to the drum. Near opposite ends of the pinion arm 24 are a pair of shafts 30 and fixed to one end of each shaft 30 is a pinion gear 32 which meshes with and is driven by the input gear 20. Also fixed to each shaft 30 adjacent each pinion gear 32, and driven by it, is an eccentrically mounted disc 34 of a relatively heavy material. As the discs rotate eccentrically, they exert cyclically a rotative forward force and a backward force on the pinion arm 24. In the embodiment of FIG. 1, a sprag clutch 36 is attached to the pinion arm 24 which prevents any backward rotation about the shaft 22 due to the eccentric disc members 34. Thus, with every rotation of the pinion 32 and their eccentric discs 34, a forward force is exerted on the ends of the pinion arm 24, which causes it to turn on the shaft 22 and produce torque.

Each end of the pinion arm 24 is connected to the output arm 26 by a load spring 38 which functions to smooth out the pulsating forces on the pinion arm 34 to a more steady torsional force on the output arm 26. The drum 28 fixed to the hub of the output arm 26 is coaxial with the support shaft 22 and provides a means for connecting the transmission output with a suitable output shaft.

In the operation of transmission 10, the eccentric mass discs 34 are rotated by their pinion 32 via the input gear 20, the average rotational speed of pinions and eccentric discs being determined by the differential speed between input and output, with a superimposed cycle variation as described below relative to the diagrammatic representation of FIG. 2.

The centrifugal force of the eccentric masses when the output is in the forward direction is applied to the output member through the load springs 38. When the output is stalled, i.e. not rotating, the eccentric masses will extend the load springs until the output torque is the product of the centrifugal force and the radius of the pinion center from the major axis of transmission 10. The centrifugal force is opposed when it is in the rearward direction by a reaction member coupled to some static member of the transmission, which in the embodiment of FIG. 1 is the shaft 22. The reaction member in this case is the one-way sprag clutch 36 which is represented in FIG. 2 by a ratchet dog member 33 at the end of the pinion arm 24 and a ring ratchet 35. The clutch engages when the motion of the pinion carrier arm 24 decelerates to zero velocity, and releases as the carrier arm 24 begins to move in a forward direction when the torque produced by the component of centrifugal force in the forward direction plus the added torque from the input gear 20 exceeds the magnitude of the torque produced by the force in the load spring 38. The impulse delivered to the output arm on each rotational cycle of the eccentric mass is the product of the mass and the difference in tangential component of velocity at the points of engagement and disengagement of the reaction member.

Although the transmission arrangement that is described above relative to FIGS. 1 and 2 is a relatively simple structure, an analysis of the inertial cycle is much less so. The motion of the pinion arm 24 and the eccentric masses 34 is complex, since any forward motion of the arm decreases the angular velocity of the pinions and the attached masses. FIGS. 3A, 3B and 3C illustrate the relative motions of the elements in this transmission arrangement. In the uppermost graph 3A the sine of the angle of rotation for the input gear 20 is the curve labeled 'G', which is a steady sinusoid since the input speed is constant. The curve "P" is the sine of the angle of the eccentric mass disc 34 relative to the pinion arm 24, and the curve "A" represents the sine of the rotational angle of the pinion arm 24 which is connected by the load spring 38 to an output arm 26 that produces output torque "T" for the transmission. The advancement of the pinion arm can be seen to start and stop cyclically at the frequency of rotation of the eccentric masses. An increase in input torque with a constant output torque can be seen in FIG. 3B to result in an increase in rotational speed of the input, pinion, and output; the advancement of the output arm can be seen to occur for a larger fraction of the pinion's rotational cycle. The effect of an increase in output torque is shown in FIG. 3C. As might be expected, the output speed is reduced, and the arm advance occurs during a lesser fraction of the rotational cycle.

As explained above, the forward torque on the arm assembly is the product of the sum of the centrifugal forces of the rotating masses and the radius of their rotational axis with respect to the centerline of the torque converter, plus the input torque that is applied to rotate the pinions. The rotational speed of the masses is a function of the difference in the rotational speeds of the input gears and the arm assembly. Since the centrifugal force on a rotating mass in turn is a function of the square of its rotational speed, the output torque under stall conditions, i.e. with no output rotation, is simply a function of the square of the input speed. There is no input torque under this condition except for that required to overcome a small amount of friction, since no work is being done by the output.

As the output shaft begins to rotate, the rotational speed of the masses will be reduced since the arm and pinions will also rotate. The output torque will drop as a function of the reduced rotational speed of the masses.

A generalized relationship between output torque and speed with a constant input speed is shown in FIG. 3D. A family of such curves could be drawn for various input speeds in which the stall torque would vary with the square of input speed, a relationship that has been verified both analytically and experimentally.

In a modified more versatile form of the invention shown in FIGS. 4 to 8, a transmission 40 is contained within a cylindrical housing 42 which may be supported on a series of mounting blocks 43. As shown in FIG. 7, an input shaft 44 which is connectable to the output shaft of an engine (not shown) is supported in a bearing 46 at one end of the housing and drives a first internal gear 48 having a circular series of gear teeth 50. This gear has a hub about an enlarged hollow end portion 54 of the input shaft. Journaled by a bearing 56 within the hollow end portion is one end of an aligned output shaft 58. At its other end, this shaft is supported in another bearing 60 in the housing and extends outside the housing to whatever drive means (not shown) the transmission 40 is to be used for.

Adjacent to the first internal gear 48 is a second internal gear 62 which has its own series of circular gear teeth 64. The second gear 62 has a hub portion 66 that is separated from the hub portion 54 of the first gear by a bearing means 68, e.g. needle bearings, thereby allowing the second gear to be rotatably adjustable relative to the first gear.

In the embodiment shown in FIG. 5A, relative movement between the first and second gears is made possible by a gear section 70 of the hub 54 on the first gear which has circumferential gear teeth that mesh with movable gear racks 72 and 74 on a pair of actuators 76 and 78 in the hub of the second gear 62. As seen in FIGS. 5A and 5B axial movement of the actuators serves to rotate the first gear 48 relative to the second gear 62. Both actuators are slidable within a cylindrical cavity 80 in the hub 66 of the second gear and they are movable, like pistons, by hydraulic force working against return compression springs 81. A port at one end of each actuator cavity 80 communicates via a rotating coupling 83 with a hydraulic pressure source 85 (indicated schematically) preferably through a passage 82 that extends through the output shaft from a port 84 as shown in FIG. 7 connected to a suitable external pressure fluid source 85.

A pressure lubrication system is provided for the various bearings of the transmission 40. From an oil pressure source, indicated schematically by numeral 99, the lubricant is supplied through a passage 101 in the output shaft 58 to the bearings 90 and 92 and to other bearings, where needed.

Rotatable about the transmission output shaft 58 is a arm assembly 86 which has a central hub portion 88 supported on the output shaft by a pair of bearings 90 and 92. Extending radially from the central hub portion are four pairs of spoke members 94, spaced 90° apart, and at the outer end of each spoke member is a bearing sleeve. Two pairs of the spoke members that are 180° apart have sleeve members 96a of equal length while the other intermediate spoke members which are perpendicular to the previous spoke members and also 180° apart have sleeve members 96b that are slightly longer in length. Within the sleeve members 96a and 96b are journaled rotatable shafts 98 and 100 respectively. The shafts 98 are slightly shorter in length than the shafts 100 and fixed to the opposite ends of each shaft is a disc assembly 102.

Each disc assembly is comprised of a circular body 104 of relatively light, but durabe material, such as graphite fiber, and fastened near the outer edge of each disc assembly is a relatively large mass (compared with the disc body) in the form of an arcuate segment 105 of heavy metal. At one end of each shaft 98 one disc 104 is attached to and adjacent a coaxial pinion gear 106. Similarly, a disc 104 is attached to one end of each shaft 100 and is adjacent a pinion gear 108. The pinion gears 106 on the shafts 98 are sized to mesh with the inner teeth 50 of the first internal gear 48, and the other pinion gears 108 on the shafts 100 are sized to mesh with the inner teeth 64 of the second gear 62. Thus, when the input shaft 44 is turned, both the first and second gears 48 and 62 turn in the same direction and thereby cause their engaged pinion gears 98 and 100 and their attached mass discs 104 to spin at even a greater speed.

Between the pairs of pinions 106 and 108 on the arm assembly 86 and attached to the bearing sleeves 96a and 96b at the ends of its radial spokes 94 is a clutch means 110 that prevents any rotation of the arm assembly in the rearward rotational direction during operation of the transmission. Thus, as the pinions and their attached mass-discs 104 spin, the centrifugal force caused by the attached mass member 105 to each disc 104 causes both a force forward and then rearwardly during each revolution. However, the clutch means 110 prevents the rearward force from moving the arm assembly 86, so the resultant net rotative force on the arm assembly is only in the forward direction.

The clutch means, in the embodiment shown in FIG. 7, consists of an electromagnet 112 and eleven co-axial thin discs. The number of discs in the clutch is proportional to the torque rating of the clutch and can be as few as one or as many as are required to develop the needed torque. The electromagnet is comprised of two electrical coils 114 and an annular steel frame 116 that is secured to the housing 42. The inner end surfaces 118 of the frame face airgaps adjacent the outermost of a series of thin discs that are attached to the arm assembly and are contoured to provide a continuous set of radial teeth having a rectangular cross-section. The coils 114 are connected in series and when supplied with electric current from a D.C. power source, (e.g. battery, not shown), the magnetic flux is caused to flow through the frame 116 and through all of the discs to complete a magnetic circuit around the coils.

All of the surfaces of the thin discs that are normal to the axis of rotation are contoured with radial teeth of exactly the same pitch as those in the electromagnet frame. When all of the teeth in the discs are aligned with the teeth in the electromagnet frame, the airgaps in the magnetic circuit are minimized and the assembly is in a condition of minimum stored energy, that is, in a stable position.

Two of the thin discs, designated by numeral 120 are attached to the electromagnet frame 116 and thus are fixed in position. They are spaced away from the inner end surfaces 118 of the frame by the thickness of rotating disc 122 plus a few thousandths of an inch to provide an airgap so that a rotating disc 122 can operate freely in the space as shown. Six rotating discs 122, having an annular shape, as shown in FIG. 10A, are attached to the arm assembly and extend around the bearing sleeves 96A and 96B. These six discs are spaced apart by a distance that is greater than their own thickness by a few thousandths of an inch. As shown in FIGS. 10B-10D, these discs all have spaced apart radial teeth 124 on each side surface. Three annular discs designated by numeral 126, are spaced apart by similar spaces and are fastened together, with two radially extending operating lugs 128 which extend through openings 130 in the annular frame at locations 180° apart. The lugs are operated in a rotational motion by an actuator 132 that is constructed to move the three-disc subassembly 126 thru an angular distance equal to the width of one tooth on the discs (See FIG. 5B). The actuator in its normal position holds the three disc subassembly in a position in which the teeth in the three discs are rotationally aligned with the spaces between the teeth in the electromagnet frame 116 and in the two discs 120 that are attached to it.

The remaining six discs 122 attached to the arm assembly 86 are interleaved between the discs 126 as well as the discs 120 extending from electromagnet frame that were described above.

In its most elemental form, the magnetic clutch would have a single rotating disc 122 attached to the arm assembly 86 and a single displaceable disc 126.

The fundamental operating principles for the magnetic clutch 110 may be more readily understood by reference to diagrammatic FIGS. 9A-9F.

FIG. 9A shows the magnitude of the electromagnetic force "F" that is exerted on a moving tooth 134 or series of teeth having a width "W" as it moves past a fixed series of teeth 136 of the same width. This force pulls the moving tooth in a forward direction as it approaches an aligned position with a displacement "Δ" and pulls the tooth 134 in a rearward direction as the tooth passes the aligned position. The resulting relationship is thus one similar to a sinusoid, as shown in FIG. 9B wherein alternating positive and negative forces are developed as the displacement varies. Thus, when two sets of fixed teeth are disposed 180° apart, i.e. when the teeth of one set are aligned with the spaces between teeth on the other, the forces developed on the moving teeth that are operated in common with both sets of fixed teeth will nearly cancel to zero.

FIG. 9C shows a movable element 138 with spaced apart magnetically permeable moveable teeth members 140 between fixed teeth 136 and a rack of displaceable teeth 144 connected to a spring 142. In FIG. 9C, when the moving teeth 140 of the movable rack are traveling to the right, the forces $F_f$ and $F_b$ on them will cancel out to near zero as shown in the FIG. 9D. Now, when the moving teeth stop and are moved rapidly to the right past the fixed teeth, the fixed teeth will be urged alternately to the right and then to the left as the moving teeth approach and then depart from an aligned position. The set of the displaceable teeth that is spring loaded are held against the right a stop 145, as shown in FIG. 9C even when magnetic force $F_b$ is toward the left because the teeth cannot mechanically respond to the high frequency of the alternating magnetic force. When the moving teeth stop and begin to pass this set of fixed teeth in a leftward direction, the spring loaded set of teeth move slowly leftward against the spring load until they are stopped in an aligned position with the other set of fixed teeth 136. In this position, as shown in FIG. 9E, a maximum electromagnetic force ($F_t$ and $F_b$) is developed to resist further leftward motion of the moving teeth, since the force relationships are now in phase instead of being 180° out of phase. Thus, the moving teeth 140 are locked against further leftward motion, yet can freely move to the right since the spring load will move the displaceable fixed teeth back into a position 180° out of phase whenever rightward movement begins.

In the transmission 40, the three displaceable discs 126 perform the function of providing the 180° offset from the fixed teeth, the actuators 132 perform the function of the spring 142, and the rotating discs 122 perform the function of the moving teeth 140 in FIGS. 9C and 9E. Therefore, when the eccentric masses 105 rotate and the arm assembly 86 is urged successively in the clockwise and counter clockwise directions, it will move freely in a clockwise direction, but will be prevented from moving in a counterclockwise direction when the electromagnetic clutch 110 is caused to lock up by the latching movement of the movable three-disc subassembly 126.

It should be noted that the clutch shown in the transmission 40 is merely an expansion of the basic embodiment described by FIG. 9 wherein groups of elements are used to perform the same functions as the single elements of the basic embodiment. Therefore, for some applications, that the clutch could be constructed with only single elements.

FIGS. 11A and 11B illustrate the operation of the magnetic clutch shown on the transmission 40. In FIG. 11A the actuator 132 has moved the teeth of the three disc sub-assembly 126 out of transverse alignment with the fixed teeth of the discs 120 and the end surfaces 118. In this position, the flux through the clutch creates magnetic forces in both directions which essentially balance out to zero, and this causes the rotating discs 122 of the clutch to be in a freewheeling mode.

Now, as shown in FIG. 11B, when the motion of the disc assembly 122 stops and then reverses, it pulls the rotationally displaceable discs 126 rearwardly against the spring force of the actuator 132, and moves the teeth of the three displaceable discs 126 and fixed discs 118 and 120 into alignment. This causes the internal force components on the disc teeth to assume the same forward direction so that total force on the rotating discs are maximized in the forward direction. Therefore, the clutch allows rotation of the discs 126 and thus the arm assembly 86 in the forward direction but locks up in the reverse direction in accordance with the normal operation of the transmission 40.

It should be noted that the function of the clutch can also be accomplished using a different form or number of magnetic elements as well as with other forms of mechanical one-way clutches such as sprag or ratchet types, but the electro-magnetic clutch as described provides important advantages such as smooth operation and minimal wear characteristics.

It should also be noted that many other arrangements of magnetic clutches are feasible. For example, the function of the thin discs could be provided with thin, toothed, annular members instead, and the function of the coil could be replaced with a permanent magnet. Further, a magnetic clutch similar to those described but of lesser torque capacity could be used to actuate a positive mechanical clutch in order to increase the torque capacity of the torque converter.

The arm assembly 86 also includes a cylinder input arm 146 which is attached to an end hub portion 148 of the arm shaft 88, that is spaced axially from the spider arm 94 for supporting the pinions. As shown in FIG. 6, the input arm extends radially from opposite sides of the hub portion 148 on the tubular arm shaft 88 and has sleeve like bearing members 150 at each opposite outer end. A tubular member 152 fits within and extends beyond the opposite ends of each sleeve bearing. Attached to the projecting ends of each tubular member is a load isolation cylinder 154. The other end of each cylinder has a clevis 155 which fits around a projecting pin 156 provided at each outer end of an output torque arm 157 whose hub is attached to an enlarged section 159 of the output shaft 58 for the transmission 40.

The load isolation cylinders 154 serve to smooth out the intermittent torsional impulses imparted to the arm assembly by the alternating backward and forward forces created by the mass discs 105 so that relatively smooth non-pulsating torsional force is applied to the output shaft 58. One structural form of a satisfactory load isolation cylinder is shown in detail in FIGS. 8A and 8B.

Each load isolation cylinder 154, as shown in FIG. 8A comprises an outer housing 160 having at one end an integral ring portion 155 with a bore having an inner bushing 164. At its other end is a fixed annular head 166 with a bore 168 for receiving a movable rod 170 attached at its inner end to a piston 172. The outer end of the piston rod is attached to a clevis 174 that is attached to arm 146 by tubular member 152. The piston is slidable within an internal sleeve 178 that is fixed within the housing 160. It has a central longitudinal passage 180 that extends axially through the piston and its rod 170 and is open through a connecting passage 182 in the second clevis to the atmosphere. When the piston 172 is retracted within the load cylinder 154, as shown in FIG. 8B, the sleeve 178 forms an inner annular chamber 184 around the rod and an outer annular chamber 186 between the sleeve and the outer housing 160. A series of openings 188 at one end of the sleeve provides passages between the aforesaid inner and outer chambers. A straight passage 190 is provided through the annular head 166 to the inner chamber and contains a slidable valve 192 having an enlarged head at its outer end. The outer opening to the passage 190 is connected by a conduit 194 to a suitable air pressure source, designated by numeral 196. (The air pressure is supplied through a passage 197 in the shaft 58 and through a rotating coupling 195). A stem portion of the slidable valve 192 extends through the passage 190 and into the inner chamber 184 when its head is closing the outer opening to the passage.

A similar straight passage 198 provided in the piston head contains a second slidable valve 200 with a head that closes an opening to the passage 198 on the inner surface of the piston within the inner chamber. A stem portion of the second slidable valve extends beyond the outer end surface 202 of the piston head when the valve is in its closed position.

The purpose of the valving in the load cylinders 154 is to cause them to always function within a normal range of lengths, and their operation may be described as follows:

As the torque converter 40 operates, the cyclic forward motion of the output torque arm 157 causes the load cylinders 154 to extend cyclically as indicated in FIG. 6. This causes the air in the chambers 184 and 186 to be cyclically compressed, raising the pressure. At the same time, the effective radius (ER) of the line of action (LA) of the cylinders becomes less, so that the torque being transmitted by the cylinders 154 tends to remain constant. The output torque from the convertor 40 thus is relatively constant, i.e., without any cyclic torque variations.

If the magnitude of the torque from the arm assembly 86 increases significantly, the time averaged length of the load cylinder 154 will increase until their pistons 172 periodically strike the stem of valve 192. This causes the valve to open momentarily and admit compressed air that is supplied from inlet tube 194. This in turn increases the pressure in the cylinder and prevents further lengthening. Thus the cylinder will always protect itself from overextending when increasing torques are imposed on it.

Conversely, if the torque being developed by the output arm 157 decreases, the pressure in the cylinder will be greater than is required to develop that torque. The excessive pressure will retract the cylinder until the stem of valve 192 in the piston cyclically strikes the end wall of housing 160. When this happens, compressed air in the cylinder is released from chambers 184 and 186 to flow thru the center passage 180 of the piston rod into the atmosphere. Thus the cylinder will always protect itself from complete retraction as decreasing torque is imposed on it.

Summarizing the operation of the transmission 40, rotational power supplied to the input shaft 44 causes the first and second gears 48 and 66 to rotate the four pinion gears and thus the connected mass-discs 104. Because of the mass member 105 attached to each disc, a sinusoidal centrifugal force is created by each disc and for each rotational cycle the force acts first to produce a forward rotational force on the arm assembly and secondly to provide a reverse rotational force. The clutch 110 when activated functions to neutralize the reverse rotational force, so that only the forward force is effective to turn the arm assembly 146 on the output shaft 58 . As the arm assembly turns, it transmits forces through the load isolation cylinders 154 to also turn the output torque arm 157 which is fixed to the output shaft.

When the two pairs of mass-discs 104 are "in-phase", that is, when both pairs are oriented with respect to the arm assembly so as to concurrently exert a maximum amount of forward force on the arm assembly, maximum torque will be produced by the output shaft. However, by utilizing the adjustable racks 72 and 74 and pinion 70, the phase orientation on one pair of mass-discs can be changed relative to that of the second pair of mass discs to thereby reduce the output torque produced by the output shaft. This phase-changing feature is readily illustrated in FIGS. 5A and 5B. As shown, by changing the relative locations of the first and second gears 48 and 66, the locations of the mass members on the discs relative to each other are also changed. At one extreme position, the mass members are located so that the forward forces produced by the 2 pairs of discs are in phase and thus additive or complementary. At the other extreme position, the mass members of one disc pair are opposite from the position of the mass-members for the other disc pair at any given time. Thus, in this out-of-phase condition the torsional forces on the output shaft produced by one pair of discs will cancel out the torsional forces in the opposite direction so that the output torque will be zero. Of course, the adjustment of the relative position of two gears 48 and 66 anywhere between the aforesaid zero and maximum positions, produces an intermediate level torque output.

From the foregoing, it is apparent that a torque converter embodying the principles of the present invention provides a highly versatile transmission that is adaptable to a wide range of applications. The control ranges for the clutch 110 and for the phase relationship of the two sets of pinion wheels enable the transmission to adjust both speed and output torque to meet different load requirements.

To those skilled in the art to which this invention relates, many changes in construction and widely differing embodiments and applications of the invention will suggest themselves without departing from the spirit and scope if the invention. The disclosure and the description herein are purely illustrative and are not intended to be in any sense limiting.

What is claimed is:

1. A mechanical torque converting transmission adapted for use with a rotary power source, said transmission comprising:
   a rotary input shaft adapted for attachment to the rotary power source for supplying input torque at a preselected speed;
   a main gear means connected to said rotary input shaft;
   an output shaft;
   a rotatable arm assembly;
   pinion gear means meshed with said main gear means and journaled for rotation on said arm assembly about an axis spaced from and parallel to the rotational axis of said main gear means;
   eccentric means driven by said pinion gear means for creating a centrifugal force that cyclically urges said arm assembly in alternating forward and backward directions with a pulsating motion during each rotation of said eccentric means;
   clutch means for allowing forward movement of said arm assembly while preventing said arm assembly from moving in the backward direction during each said cycle; and
   resiliently displaceable means interconnecting said arm assembly and said output shaft for transforming the pulsating motion of said arm assembly to a smooth rotational motion of said output shaft; whereby said output shaft may be caused to rotate at a lower speed but at a higher torque than said input shaft.

2. The transmission as described in claim 1 wherein said main gear means comprises a single spur gear and said pinion gear means comprises a pair of gears meshed with said spur gear.

3. The transmission as described in claim 1 wherein said main gear means comprises two ring gears and said pinion gear means comprises two pairs of pinion gears, each pair being meshed with one said ring gear.

4. The transmission as described in claim 3 including means for changing the phase relationship between said pairs of pinion gears so that one pair of eccentric means attached to one said pair of pinion gears will produce centrifugal force components that can be varied in direction relative to the force components produced by the eccentric means attached to the other said pair of pinion gears.

5. The transmission as described in claim 4 wherein said means for changing the phase relationship between said two pairs of pinions comprises hydraulic actuator means for moving the angular position of one said ring gear relative to the other ring gear.

6. The transmission as described in claim 5 wherein said eccentric means comprises a disc means directly connected to each said pinion gear, and a concentrated weight means attached to the periphery of each said disc means at a preselected location.

7. The transmission as described in claim 6 wherein said clutch means comprises a mechanical magnetically controlled device located axially between said disc means that prevents rearward movement and allows forward movement of said arm assembly.

8. The transmission as described in claim 5 wherein said arm assembly comprises a pair of diametral members at right angles to each other and attached near their centers to a hub member that is rotatable around the axis of said output shaft, each of said diametral members supporting one said pinion gear means near each of its ends.

9. The transmission as described in claim 1 wherein said eccentric means comprises a concentrated weight means directly connected to each said pinion gear means.

10. The transmission as described in claim 1 wherein said arm assembly comprises a relatively straight diametral member journaled at its center on the axis of said output shaft and supporting one said pinion gear means near each of its outer ends.

11. The transmission as described in claim 1 wherein said arm assembly comprises a pair of diametral members at right angles to each other and attached near their centers to a hub member that is rotatable around said output shaft, each of said members supporting one said pinion gear means near each end of said diametral members.

12. The transmission as described in claim 1 wherein said clutch means comprises a sprag clutch.

13. The transmission as described in claim 12 wherein said clutch means comprises a rachet means on said arm assembly.

14. The transmission as described in claim 1 wherein said clutch means comprises a mechanical magnetically controlled device that prevents rearward movement and allows forward movement of said arm assembly.

15. The transmission as described in claim 14 wherein said mechanical magnetically controlled device comprises a first means attached to said housing having a series of fixed teeth of magnetically permeable material and a second means spaced from and moveable relative to said first means having a second series of magnetically permeable teeth, a third means connected to said arm have a third series of magnetically permeable teeth, and means for moving said second means relative to said first means to control the flux through said teeth and thus the formal movement of said third means.

16. The transmission as described in claim 1 wherein said resiliently displaceable means for connecting said arm assembly to said output shaft is a coiled spring.

17. The transmission as described in claim 1 wherein said resiliently displaceable means for connecting said arm assembly to said output shaft comprises a pair of load isolation cylinders each having a housing and a movable piston within said housing.

18. The transmission as described in claim 17 wherein each said load isolation cylinder comprises:
a housing having one end connected to said output arm;
a cylindrical chamber within said housing;
a piston that is slidable within said first chamber;
a piston rod attached to said piston and having an outer end extending outside of said housing, said outer end includes means for connecting said rod to said torque arm on said output shaft;
means including a first valve means for supplying pressurized fluid to said chambers; and
means including a second valve means for releasing fluid from said chambers when said piston moves within said first chamber; whereby said load cylinders serve to couple the pulsating movement of said arm assembly to the constant rotational movement of said output shaft.

19. The transmission as described in claim 1 wherein said clutch means comprises:
an annular frame means of magnetically permeable material fixed to said housing and having end faces that are spaced apart;
an annular coil means within said frame means and surrounding said arm assembly;
a first series of clutch plates fixed to said arm assembly and adapted to rotate with it,
said clutch plates being adjacent to said end faces and spaced apart by a distance greater than their thickness, each said plate having radially extending magnetically permeable teeth that are circumferentially spaced apart;
a second series of fixed annular plates attached to said frame means and extending between pairs of said first plates and having magnetically permeable teeth of the same size and spacing as said teeth on said first series of plates;
a third series of annular plates extending between plates of said first series and having teeth of the same size and spacing, said third series being attached to a peripheral member;
actuator means connected to said peripheral member for adjusting;
said third series of plates arcuately to place the teeth thereof into and out of transverse alignment with the teeth of said first and second series of plates.

20. The transmission described in claim 1 wherein said clutch means comprises:
an annular frame means of magnetically permeable material fixed to said housing and having first and second faces that are spaced apart, the first one of said faces having radially extending teeth that are circumferentially spaced apart;
an annular coil means within said frame means;
a first clutch disc means fixed to said arm assembly and adapted to rotate with it;
said clutch disc being adjacent to the said first end face with radially extending teeth and spaced apart from it having radially extending magnetically permeable teeth that are circumferentially spaced apart;
a rotationally displaceable second disc adjacent to said first disc and said second end face with radially extending magnetically permeable teeth that are circumferentially spaced apart and having a peripheral attachment member;
actuator means connected to said peripheral attachment member for urging said second disc in a forward direction into a position wherein the teeth of said second disc are out of rotational alignment with the teeth of said first end face.

21. The transmission as described in claim 1 wherein said clutch means comprises:
an annular frame means of magnetically permeable material fixed to said housing and having end faces that are spaced apart;
an annular coil means within said frame means connected to an electrical power source and surrounding said arm assembly;
a first series of clutch plates fixed to said arm assembly and adapted to rotate with it,
said clutch plates being adjacent to said end faces and spaced apart by a distance greater than their thickness, each said plate having radially extending teeth of magnetically permeable material that are circumferentially spaced apart;

a second series of fixed annular plates attached to said frame means and extending between pairs of said first plates and having magnetically permeable teeth of the same size and spacing as said teeth on said first series of plates;

a third series of annular plates extending between plates of said first series and having teeth of the same size and spacing, said third series being attached to a peripheral member;

actuator means connected to said peripheral member so that said third series of plates can be adjusted arcuately to place the teeth thereof into and out of transverse alignment with the teeth of said first and second series of plates.

22. A mechanical torque converting transmission adapted for use with a rotary power source, said transmission comprising:

a rotary input shaft adapted for attachment to the rotary power source for supplying input torque at a preselected speed;

a first gear means connected to said rotary input shaft;

a second gear means connected to and coaxial with said first gear means;

an output shaft axially aligned with said input shaft;

an arm assembly rotatable on the axis of said output shaft;

a first pair of pinion gears meshed with said first gear means and a second pair of pinion gears spaced from said first pair and meshed with said second gear means, all of said pinion gears being journaled for rotation on said arm assembly about axes that are spaced 90° apart and parallel to the rotational axis of said arm assembly;

eccentric means driven by each said pinion gear means for creating a centrifugal force that cyclically urges said arm assembly in alternating forward and backward directions with a pulsating motion during each rotation of said pinion gears;

clutch means for allowing forward movement of said arm assembly while preventing said arm assembly from moving in the backward direction during each said cycle; and a first radial arm connected to said arm assembly and rotatable on the axis of said output shaft;

a second radial arm having a hub portion fixed to said output shaft;

displaceable means for interconnecting the ends of said first and second radial arms, thereby causing said output shaft to be rotated at a lower speed but at a higher torque than said input shaft.

23. The transmission as described in claim 22 wherein said displaceable means for interconnecting said first and second radial arms comprises a pair of load isolation cylinders each having a housing connected to the arm for said output shaft and a movable piston within said housing connected to the first arm for said arm assembly.

24. The transmission as described in claim 23 wherein each said load cylinder comprises:

a housing having one end connected to said output arm;

a cylindrical chamber within said housing;

a piston that is slidable within said first chamber;

a piston rod attached to said piston and having an outer end extending outside of said housing, said outer end includes means for connecting said rod to said torque arm on said output shaft;

means including a first valve means for supplying pressurized fluid to said chambers; and means including a second valve means for releasing fluid from said chambers when said piston moves within said first chamber; whereby said load cylinders serve to reduce the pulsating movement of said arm assembly to a more constant movement for said output shaft.

* * * * *